(12) United States Patent
Georgiev et al.

(10) Patent No.: US 8,019,596 B2
(45) Date of Patent: Sep. 13, 2011

(54) LINGUISTIC SERVICE PLATFORM

(75) Inventors: Dimiter Georgiev, Bellevue, WA (US);
Shenghua Ye, Sammamish, WA (US);
Gerardo Vilarreal Guzman,
Woodinville, WA (US); Kieran Snyder,
Seattle, WA (US); Ryan M. Cavalcante,
Seattle, WA (US); Tarek M. Sayed,
Sammamish, WA (US); Yaniv Feinberg,
Redmond, WA (US); Yung-Shin Lin,
Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 560 days.

(21) Appl. No.: 12/147,389

(22) Filed: Jun. 26, 2008

(65) Prior Publication Data
US 2009/0326920 A1 Dec. 31, 2009

(51) Int. Cl.
*G06F 17/27* (2006.01)
(52) U.S. Cl. .............................. 704/9; 704/257; 704/270
(58) Field of Classification Search .................. 704/255, 704/270, 270.1, 1–10, 257, 271; 717/122
See application file for complete search history.

(56) References Cited

U.S. PATENT DOCUMENTS

| | | | |
|---|---|---|---|
| 5,548,507 A | 8/1996 | Martino | |
| 5,966,637 A | 10/1999 | Kanungo | |
| 6,002,998 A | 12/1999 | Martino | |
| 6,047,251 A | 4/2000 | Pon et al. | |
| 6,157,905 A | 12/2000 | Powell | |
| 6,167,369 A | 12/2000 | Schulze | |
| 6,321,372 B1 * | 11/2001 | Poirier et al. | ................. 717/122 |
| 6,338,033 B1 | 1/2002 | Bourbonnais | |
| 6,363,433 B1 | 3/2002 | Nakajima | |
| 6,366,906 B1 | 4/2002 | Hoffman | |
| 6,553,385 B2 | 4/2003 | Johnson | |
| 6,560,596 B1 | 5/2003 | Margulies | |
| 6,654,741 B1 | 11/2003 | Cohen | |
| 6,701,364 B1 | 3/2004 | Meyer | |
| 6,718,519 B1 | 4/2004 | Taieb | |
| 6,951,008 B2 | 9/2005 | Quaile | |
| 7,035,801 B2 | 4/2006 | Jimenez-Feltstrom | |
| 7,177,799 B2 | 2/2007 | Calcagno | |
| 7,191,116 B2 | 3/2007 | Alpha | |
| 7,228,501 B2 | 6/2007 | Brown et al. | |
| 7,260,574 B2 | 8/2007 | McConnell | |
| 7,295,966 B2 | 11/2007 | Barklund | |
| 7,315,810 B2 | 1/2008 | Azzam | |
| 7,346,511 B2 * | 3/2008 | Privault et al. | ................. 704/255 |
| 7,818,165 B2 | 10/2010 | Carlgren et al. | |

(Continued)

FOREIGN PATENT DOCUMENTS

WO WO 2007051246 5/2007

OTHER PUBLICATIONS

Atserias, J. "FreeLing 1.3: Syntactic and Semantic Services in an Open-Source NLP Library", Retrieved from http://www.lsi.upc.edu/~nlp/papers/2006/lrec06-accgpp.pdf., 6 Pages.

(Continued)

*Primary Examiner* — Huyen X. Vo

(57) ABSTRACT

Linguistic service platform techniques are described. In implementations, one or more computer-readable media comprise instructions that are executable by a computer to designate a linguistic service having a particular property responsive to an application program interface call specifying the property. Communication may be brokered between the linguistic service and the application so that communication occurs without the application directly communicating with the linguistic service.

19 Claims, 5 Drawing Sheets

U.S. PATENT DOCUMENTS

| | | |
|---|---|---|
| 2004/0078191 A1 | 4/2004 | Tian |
| 2004/0078204 A1 | 4/2004 | Segond |
| 2004/0088438 A1 | 5/2004 | Madril |
| 2005/0091035 A1 | 4/2005 | Kaplan |
| 2006/0026518 A1 | 2/2006 | Jung |
| 2006/0047690 A1 | 3/2006 | Humphreys |
| 2006/0074630 A1 | 4/2006 | Chelba |
| 2006/0184357 A1 | 8/2006 | Ramsey |
| 2006/0229865 A1 | 10/2006 | Carlgren |
| 2007/0242071 A1 | 10/2007 | Harding |
| 2007/0260520 A1 | 11/2007 | Jha |
| 2009/0324005 A1 | 12/2009 | Georgiev |
| 2009/0326918 A1 | 12/2009 | Georgiev |
| 2009/0327860 A1 | 12/2009 | Georgiev |

OTHER PUBLICATIONS

Li, Shanjian et al., "A composite approach to language/encoding detection", Retrieved from http://www.mozilla.org/projects/intl/UniversalCharsetDetection.html_on_3/14/08., 17 Pages.

"LanguageIdentifier.com", Retrieved from http://www.lextek.com/langid/li_on 3/14/08., 2 Pages.

"Google Notebook Browser Extension", Retrieved from http://pinkflamingoresources.blogspot.com/2007/10/google-notebook-browser-extension.html¯on_3/14/08., 3 Pages.

"NDS Browser", Retrieved from http://www.novell.com/hungary/internet/ONLINE/ADMIN/NDS.HTM_on_3/14/08., 7 Pages.

"Name-to-Thing (N2T) Resolver", Retrieved from http://n2t.info/_on_3/14/08., 6 Pages.

"Non-Final Office Action", U.S. Appl. No. 12/147,340, (Jan. 20, 2011),11 pages.

"XeLDA White Paper", *TEMIS*, Available at <http://www.temis.com/fichiers/t_downloads/file_55_Xelda_WP.pdf>, (2003),32 Pages.

Davis, Mark et al., "Unicode Technical Standard #39", Retrieved from: <http://unicode.org/reports/tr39/#Mixed_Script_Detection>_on 3/14/08, (Aug. 11, 2006), 14 Pages.

Dzbor, Martin et al., "Magpie—Towards a Semantic Web Browser", *Proceedings 2nd International Semantic Web Conference* (ISWC2003), Available at <http://kmi.open.ac.uk/people/domingue/papers/magpie-iswc-03.pdf.>, (Oct. 2003), 16 Pages.

Englmeier, Kurt et al., "Adapting the Communication Capacity of Web Services to the Language of their User Community", *ICWS 2004*, Available at <http://www.irit.fr/recherches/IRI/SIG/personnes/mothe/pub/ICWS04.pdf.>, (Jul. 20, 2004),9 Pages.

Kikui, Gen-Itiro "Identifying the Coding System and Language of On-line Documents on the Internet", *COLING '96*, Available at <http://citeseer.ist.psu.edu/cache/papers/cs/22951/ht-tp:zSzzSzwww.slt.atr.co.jpzSz~gkikuizSzpaperszSz9608KikuiCOLING.pdf/kikui96identifying.pdf>, (1996),6 Pages.

"Non-Final Office Action", U.S. Appl. No. 12/147,340, (Apr. 29, 2011),7 pages.

* cited by examiner

LINGUISTIC SERVICE PLATFORM

BACKGROUND

A service may be used to provide a function for an application. For example, the service may be used to crop a picture for a photography application. Traditionally, services are developed for a specific application and are included in the application's code. As a result, when service's code is changed or a service is added to provide function, the application's code is updated with the code for the added or changed service. Therefore, when the service is added or changed, the application's code may be impacted by the new or changed service.

SUMMARY

Linguistic service platform techniques are described. In implementations, one or more computer-readable media comprise instructions that are executable by a computer to designate a linguistic service having a particular property responsive to an application program interface call specifying the property. Communication may be brokered between the linguistic service and the application so that communication occurs without the application directly communicating with the linguistic service.

In an implementation, a designation is made that a linguistic service is available through a platform based on a property of the linguistic service. The linguistic service may recognize linguistic property information associated with text data. Communication between the linguistic service and an application may occur so that the linguistic service is obscured to the application.

In an implementation a system comprises a linguistic service to recognize linguistic property information associated with text data and a platform to broker communication between the linguistic service and an application, so the platform obscures the linguistic service to the application.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The terms "service" and/or "module," for instance, may refer to system(s), computer-readable instructions (e.g., one or more computer-readable storage media having executable instructions) and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
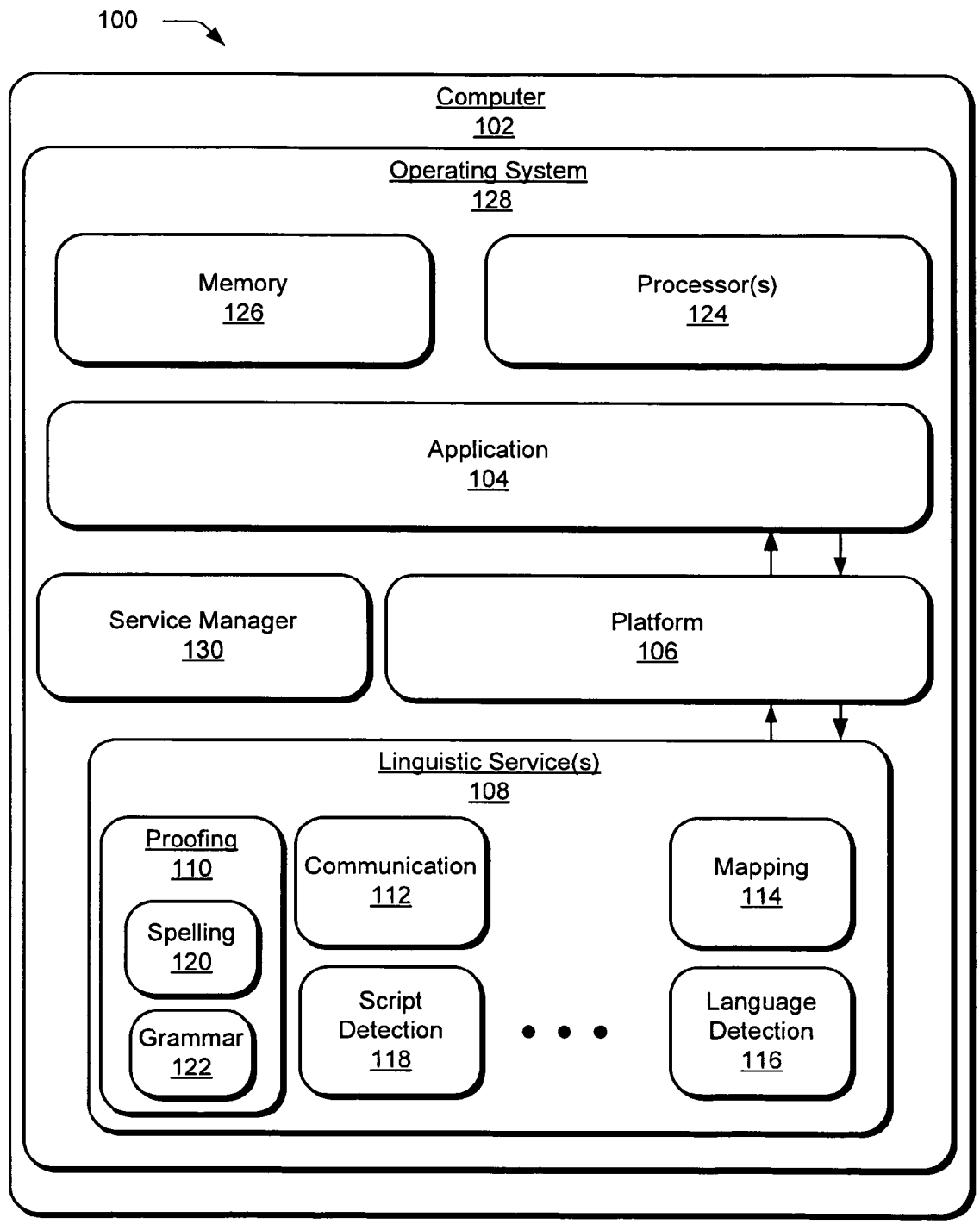
FIG. 1 is an illustration of an environment in an example implementation that is operable to employ brokered communication techniques.

Services are used to perform functions for applications. For example, a word processing application may include a service that checks text data for spelling errors, e.g., a spelling service. Traditionally, the spelling service is configured specifically for the word processing application and is included as part of the word processing application's code. Consequently, the service may not be compatible with other applications and a change or addition to the service's code may impact the word processing application.

Techniques are described to broker communication between an application and one or more services. By implementing brokered communication, linguistic services may be added or changed without impacting the application. In addition, individual instances of the linguistic service may be used by a multitude of applications. Communication occurring between the application and the linguistic service may be brokered such that the linguistic service is obscured from the application (and vice versa). In this manner, the linguistic service may be independent from the application and the application may add or change linguistic services without impacting the application.

In an implementation, one or more linguistic services may be designated, based on a property of the services, as being available use through a platform. For example, in responsive to an application program interface (API) call, the platform may designate that one or more linguistic services are available for use by the application based on one or more properties of the linguistic service, e.g., service properties. Designating linguistic services based on a property may expose the linguistic service to the application without configuring the application for the linguistic service providing the function.

In another implementation, a computer includes a platform configured to broker communication between a linguistic service and an application. The linguistic service may recognize linguistic property information associated with text data within a range of a text from the application. For example, in response to recognizing the phone number in a word processing document, a phone lookup service may return caller identification information associated with the number, e.g., caller ID. The platform may broker communication between the linguistic service and the application to obscure the linguistic service and/or the application from each other. Further discussions of designating linguistic services and brokering communication may be found in relation to FIGS. 1-5.

In the following discussion, an "Example Environment" is first described that may employ techniques to broker communication between an application and one or more linguistic services. A sample system is then described. "Example Procedures" are also described that may be employed in the example environments, as well as in other environments. Although these, systems and techniques are described as employed within a computing environment in the following discussion, it should be readily apparent that these structures, modules, techniques and approaches may be incorporated within a variety of environments without departing from the spirit and scope thereof. In addition, while text and text data are discussed the methods, techniques, approaches, service, modules and so on may be configured to implement other encoded information. For example, a service may be configured to recognize property information for a video file.

Example Environment

FIG. 1 is an illustration of an environment 100 in accordance with one or more embodiments. The environment 100 includes a computer 102 having one or more applications 104 (one is illustrated) and one or more linguistic services 108 communicating with the application 104 through a platform 106. The linguistic services 108 are representative of functionality to recognize linguistic property information associated with text data in a text. The linguistic services 108 may be available to perform one or more functions for the application 104. For example, as illustrated, the linguistic services 108 may include a proofing service 110, a communication service 112, a mapping service 114, a language detection service 116, a script detection service 118 and so on. In one or more embodiments, the linguistic services 108 may be plugins to the platform 106. For example, the platform 106 may host the linguistic services 108.

The linguistic services 108 may include modules (e.g., subservices) to perform specific functions for a linguistic service. For example, the proofing service 110 may include a spelling module 120 and a grammar module 122 and so on.

While the computer 102 is illustrated as including a processor 124 and memory 126, the processor 124 and/or the memory 126 may be representative of one or more devices, e.g., the processor 124 may be representative of a plurality of central processing units. Processor(s) are not limited by the materials from which they are formed or the processing mechanisms employed therein. For example, processor(s) may be comprised of semiconductor(s) and/or transistors (e.g., electronic integrated circuits (ICs)) that execute instructions to provide the application 104 and/or linguistic services 108. Sample processor mechanisms may include, but are not limited to, quantum computing, optical computing, mechanical computing (e.g., using nanotechnology) and so on.

Although one memory is illustrated, a wide variety of types and combinations of memory may be employed, such as random access memory (RAM), read only memory (ROM), hard disk memory, removable medium memory and other types of computer-readable media. The memory 126, for example, may be used to store instructions used by the processor(s) to provide the application 104 and/or linguistic services 108.

The computer 102 is illustrated as executing an operating system 128 on the processor(s), which is also storable in the memory 126. The operating system 128 may be representative of functionality to "abstract" underlying functionality of the computer 102. The operating system 128 may, for example, provide a foundation for the application 104 and/or linguistic services 108 to be executed on the computer 102 without having to "know" the specific configuration of the computer 102, e.g., which particular "kind" processor is employed by the computer 102, amounts of memory and so on.

The platform 106 may broker communication between the application 104 and the linguistic services 108. For example, the platform 106 may be configured to broker communications passing through the platform 106 such that the linguistic services 108 are obscured from the application 104. By obscuring the linguistic services 108 from the application 104, the linguistic services 108 may be changed or added without encoding the change or the addition into the application's code. In this manner, the linguistic services 108 may be independent from the application 104. For example, instead of configuring a first linguistic service to function for a specific application, the first linguistic service may be formed so that multiple applications may implement the first linguistic service, e.g., individual instances of the first linguistic service. Additional aspects of the platform 106 and associated benefits are discussed with respect to sample communication sessions between the application 104 and the linguistic services 108.

In one or more embodiments, a service manager 130 may be included in the computer 102. The service manager 130 may be representative of functionality to expose a way for users to manage the platform 106 and/or the linguistic services 108. For example, when a user installs a new linguistic service, the service manager 130 may be used to manage a plugin process to override a previously installed service. Thus, for example, when a new proofing service is installed, the service manager 130 may be used to manage the platform 106 and/or the linguistic services 108 so that text data for proofing is communicated to the new proofing service rather than a previous proofing service.

Figure 2:
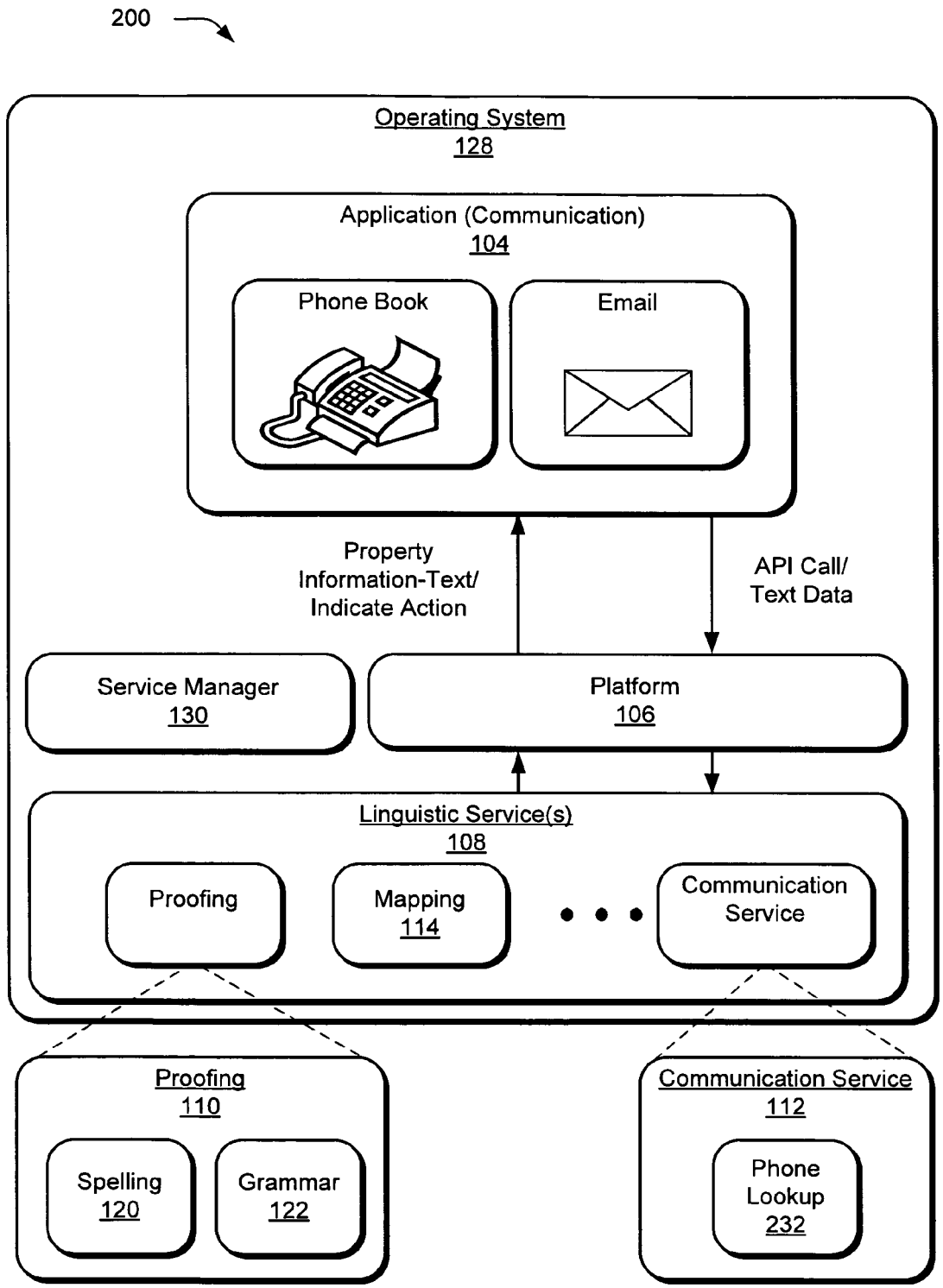
FIG. 2 is an illustration of a system in an example implementation in which a linguistic service is designated as available to an application through a platform.

Referring to FIG. 2, when initiating communication, the platform 106 may designate which linguistic services 108 (in system 200) are available for use by the application 104 (e.g., a communication application) based on a property of the linguistic service, e.g., a service property. For example, during an enumeration phase, the platform 106 may designate that the spelling property and a phone lookup property are available through the platform 106, rather than designating that the proofing service 110 and the communication service 112 are available for use by the application 104. By designating linguistic services 108 based on service properties, the platform 106 may obscure (e.g., conceal) the linguistic service providing the function to the application 104 (and vice versa). As a result, the application 104 may not be configured for a particular service in order to implement the functionality provided by the particular linguistic service. Although "a service property" is discussed, in one or more instances multiple service properties may be implemented.

For example, in response to receiving an application program interface (API) call, the platform 106 may designate the linguistic services available for use by the application 104. The platform 106 may designate that a particular linguistic service is available based on a service property of the particular linguistic service. In this way, the application 104 may not be tied to the particular linguistic service (e.g., the linguistic services 108 may be decoupled from the application 104) and the platform 106 may designate the available linguistic services without the application 104 issuing an API call specifying the particular linguistic service, e.g., an API call for the communication service 112. Moreover, the application 104 may use a limited number of API calls in comparison to issuing API calls tied to linguistic services.

In one or more embodiments, the application 104 may specify that linguistic services 108 are to be designated based on a service property specified in the API call. The application 104 may prescreen (e.g., filter) which linguistic services 108 are to be designated by specifying which service properties are relevant to the application 104. For example, a word processing application may specify that a spelling functionality is to be designated by issuing an API call specifying a spelling property. Accordingly, the platform 106 may not designate the communication service 112 because a phone lookup property was not specified in the API call. Having described designating linguistic services, communication and recognizing linguistic property information are now discussed.

Figure 3:
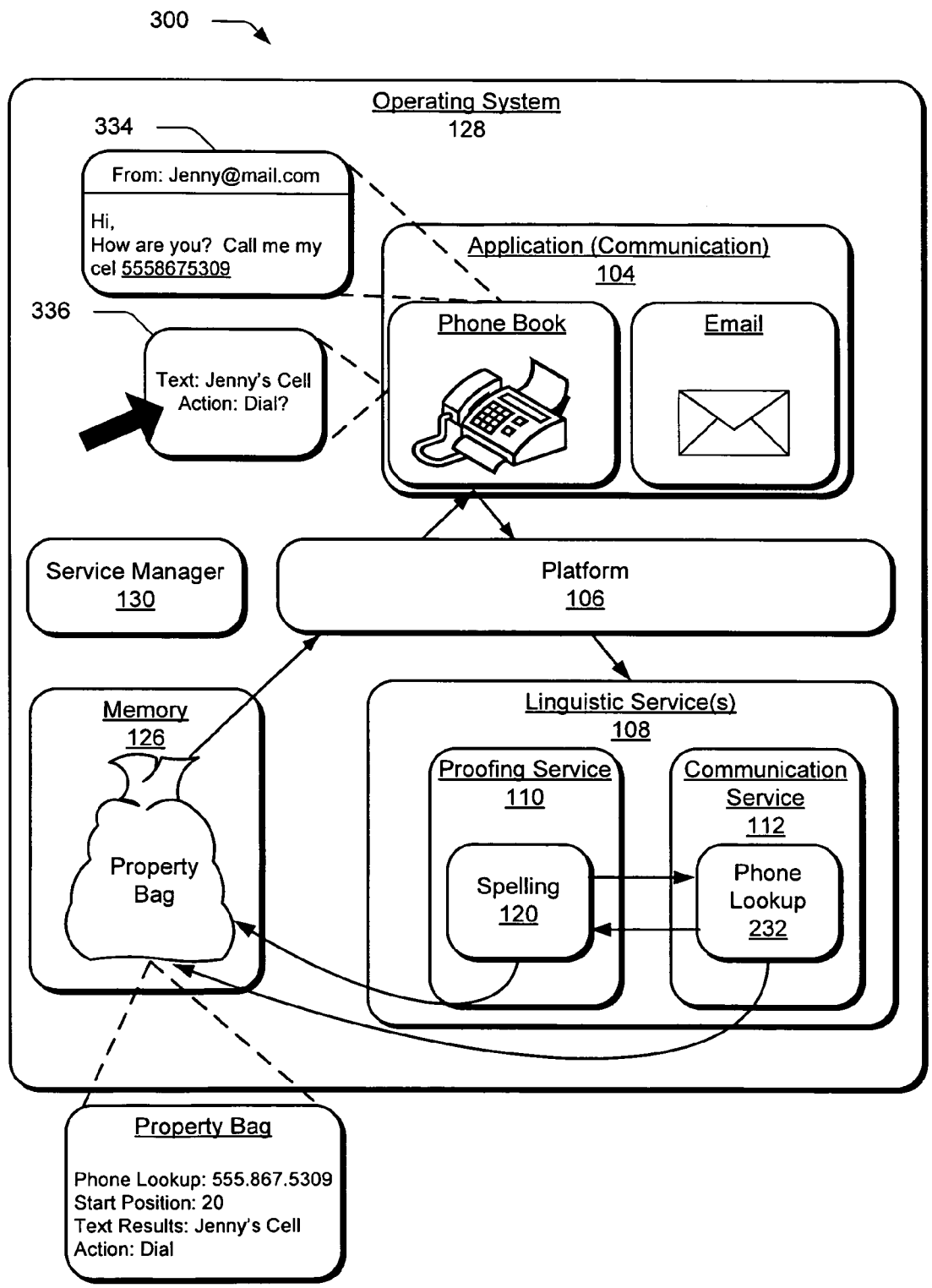
FIG. 3 is an illustration of an example implementation showing brokered communication that may be employed by a system of FIGS. 1 and 2.

Referring to FIG. 3, once the linguistic services are designated, the application 104 (in a system 300) may send a text 334 to a designated linguistic service for recognition. For example, the platform 106 may broker communication of the text 334 to the designated linguistic services. The platform 106, for example, may route or direct the text 334 to the proofing service 110.

The designated linguistic services may recognize linguistic property information associated with text data in the text 334. For example, one of the linguistic services 108 may associate linguistic property information with text data within range of the text 334, e.g., 8 bytes of data that start at a position 20 bytes into the text 334.

Consider for example, a session occurring between the application 104 (e.g., communication application) having the text 334, the proofing service 110 and the communication service 112. As illustrated, the text 334 may include a telephone number "5558675309" and the word "cel." The platform 106 may, for example, broker communication of the text 334 by directing the text 334 to the proofing service 110.

Upon receiving the text 334, the proofing service 110 may recognize linguistic property information associated with text data within a range of the text 334 and return linguistic property information to the application 104. For example, the proofing service 110 may recognize that the word "cel" is misspelled (e.g., "cel" is not in a dictionary) and that the word "cel" is an improper spelling of the word "cell." As a result, the proofing service 110 may populate the memory 126 (e.g., "property bag") with the linguistic property information indicating that the text data is misspelled and the text data is the word "cell." The proofing service 110 may associate the foregoing linguistic property information with a range occupied by the word "cel" in the email message. For example, the word "cel" may start at position 51 and go for three units in the text 334.

In the case of the communication service 112, upon receiving the text 334 (e.g., an email message), the communication service 112 may recognize that text data "5558675309" is a telephone number, e.g., the text data within the range occupied by "5558675309" corresponds to a telephone number. The range for the telephone number may, for example, start at position 55 in the text and have a length of 10 units. In response to recognizing the text data as a telephone number, a phone lookup module 232 may populate the memory 126 with caller identification information associated with the telephone number, e.g., "Jenny" and associate a range starting at position 55 with the term "Jenny".

With the linguistic property information in the memory 126, the platform 106 may communicate the text data property information. For example, the proofing service 110 may store the linguistic property information "cell" in memory 126 until the communication service 112 has recognized the telephone number—at which time, the word "cell" and the caller identification information, "Jenny," may be communicated to the application 104.

When the text data within the range has been altered (e.g., the text has been deleted or modified) since the associated linguistic property information was stored in memory 126, the platform 106 may release the memory 126 storing the linguistic property information. For example, the platform 106 may permit deletion or overwriting of a portion of the memory 126 storing the linguistic property information when the associated text data has been altered.

In one or more embodiments, the linguistic services 108 may be configured to interact with other linguistic services through the platform 106. For example, the language detection service 118 may be used to designate the text data as, for example, German before requesting that a German proofing service spell-check the text data. In the foregoing situation, the language detection service 116 may return the recognized linguistic property information (e.g., the text data is German) through the platform 106 to the German proofing service. In another example, the proofing service 110 may request that the language detection service 116 identify which human language is associated with the text data and return the linguistic property information result to the proofing service 110.

In some implementations, the linguistic services 108 may be configured to form a callback to the application 104 upon recognizing the linguistic property information. For example, the proofing service 110 may form and send the application 104 a callback that indicates that the memory 126 has been populated with linguistic property information. In response, the application 104 may instruct the platform 106 to communicate the linguistic property information.

In another implementation, the linguistic services 108 output the linguistic property information in a format indicated by the application 104. For example, as part of initiating a session, the application 104 may indicate that the proofing service 110 is to return the linguistic property information in hypertext markup language (HTML) format. In other implementations, the linguistic service 108 may return multiple versions of the linguistic property information, e.g., as Unicode text and HTML. In further embodiments, the linguistic services 108 may output linguistic property information in a format specific to one or more applications to accommodate interrelated applications.

In one or more embodiments, the linguistic services 108 may indicate that an action is associated with the text data within a range of the text. For example, the communication service 112 may indicate that text data "5558675309" is a telephone number and/or prompt the user via a user interface to initiate the communication service 112 to dial the telephone number 336.

The components, service, modules, functions and techniques discussed above may be implemented singly or in combination based on design preference. Generally, any of the modules, services and functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. Additionally, functions can be embodied as executable instructions that are included in one or more computer-readable storage media. The features of the procedures described below are platform-independent, meaning that the procedures may be implemented on a variety of platforms having a variety of processors and memory.

Example Procedures

The following discussion describes transformation procedures that may be implemented utilizing the previously described structures, modules, approaches and techniques. Aspects of the procedures may be implemented in hardware, firmware, software or a combination thereof. The procedures are shown as a set of blocks that specify operations performed by one or more devices and are not necessarily limited to the orders shown for performing the operations by the respective blocks.

Figure 4:
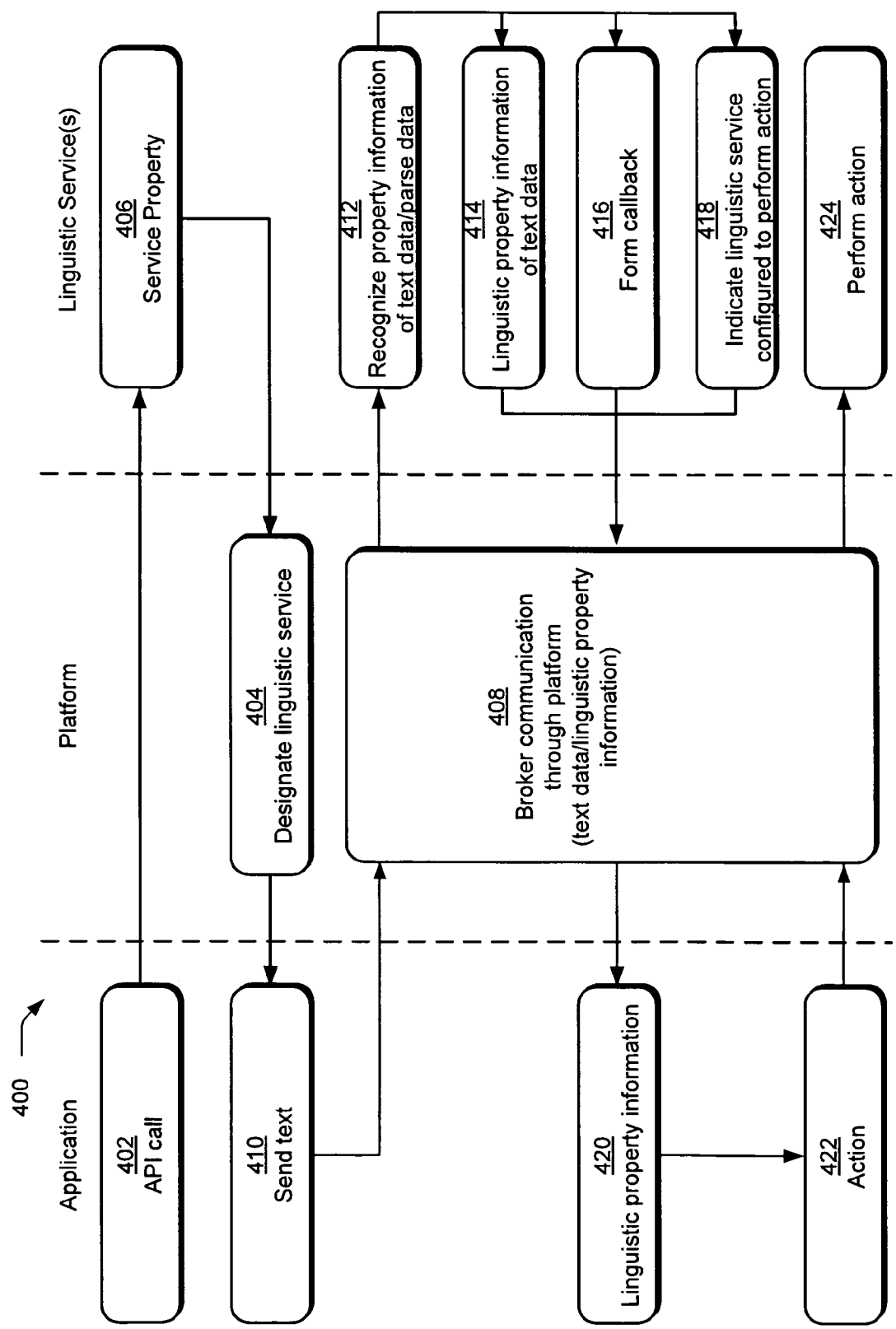
FIG. 4 is a flow diagram depicting a procedure in an example implementation in which an application and a linguistic service communicate through a platform.

FIG. 4 depicts a procedure 400 in an example implementation in which an application and one or more linguistic services communicate through a platform. For example, the procedure may be performed by the computer 102 including the application 104 and the platform 106 discussed with regard to FIGS. 1-4.

An API call requesting one or more linguistic services, based on a property of the linguistic services, is issued (block 402). In one or more embodiments, the API call specifies which service properties the application 104 wants to use. In other instances, the API call may be a general request to interact with the linguistic services available through the platform 106.

Responsive to the API call, the linguistic services that are available are designated (block 404). For example, the platform 106 may designate the linguistic services 108 that have a service property specified in the API call (e.g., a spelling property) are available to recognize linguistic property information associated with text data. The designation of the linguistic service 108 based on one or more service properties may obscure the linguistic services 108 from the application 104 (and vice versa). In the foregoing manner, the application 104 may not be specifically configured for the linguistic service 108. For example, instead of designating the proofing service 110, the platform 106 may designate the proofing service 110 based on a spelling property and a grammar property. In addition, this approach may minimize the number of different APIs used by the application in comparison to issuing API calls for a linguistic service.

In some embodiments, the platform may obtain the property of the linguistic service from the linguistic service in response to receiving the API call (block 406). In other embodiments, the platform 106 may have the property of the linguistic service 108 as the linguistic service may be a plugin to the platform 106.

In one or more embodiments, the API call may indicate that the linguistic service 108 is to output linguistic property information in a particular format. For example, the application 104 may request that linguistic property information is to be output in HTML format.

Once a session is initiated, the text including text data may be communicated through the platform (block 408). For example, the platform may broker communication of text (e.g., the email message) (block 410) passing through the platform. The platform 106 may, for example, direct communications between the application 104 and/or linguistic services 108. In some embodiments, the platform 106 may broker communications between linguistic services performing functions for the application 104. For example, the grammar service 122 and the language detection service 116 may communicate through the platform 106.

Linguistic property information associated with text data in a text is recognized (block 412). For example, the communication service 112 may recognize linguistic property information associated with text data within a range of text communicated from the application 104 through the platform 106.

Upon recognizing linguistic property information associated with text data, the linguistic property information may be communicated to the application (block 414). For example, the linguistic service 108 may populate the memory 126 with the linguistic property information associated with text data. The text data information may be stored in the memory 126 until the platform communicates (block 408) the linguistic property information to the application.

In one or more embodiments, a callback may be formed (block 416) for communication to the application (block 408). For example, when the application 104 is configured for a-synchronic communication, the linguistic service 108 may form the callback to inform the application 104 that recognition is complete.

In some embodiments, when an action is associated with the text data, the recognized linguistic property information may include an indication (e.g., an actionID) that the linguistic service may perform the action (block 418). For example, if an email address is recognized in a word processing document the communication service 112 may indicate that the linguistic service 108 can send an email message to the email address.

With the linguistic property information (block 420), the application may initiate the action (block 422) for performance by the service (block 424). In the previous word processing document example, the application may display a user interface that permits initiation of the action, e.g. create an email message targeting the email address.

Figure 5:
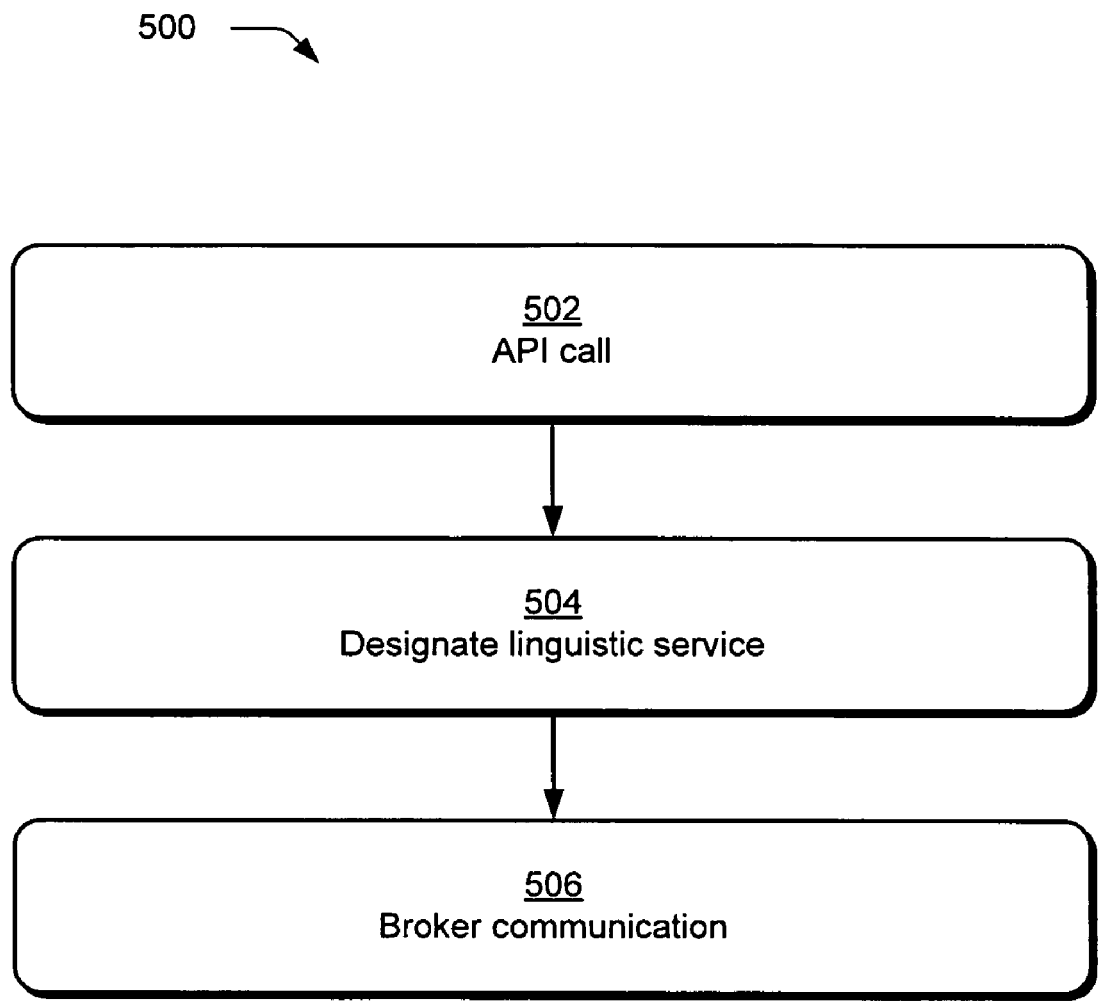
FIG. 5 is a flow diagram depicting a procedure in an example implementation that employs brokered application/linguistic service communication.

FIG. 5 depicts a procedure 500 in an example implementation employing brokered application/linguistic service communication. In this manner, communication can occur without an application directly communicating with linguistic service. For example, the platform 106 may obscure communication between the linguistic service and the application 104 so that the application does not have to be configured for the linguistic service providing a function.

An application program interface (API) call is issued (block 502). For example, the application 104 may issue an API call that specifies the application 104 is seeking linguistic services having a particular property (e.g., a telephone lookup property) or the API call may be a general request for linguistic services.

A designation is made as to the linguistic services are available to the application (block 504). For example, responsive to the API call, the platform 106 may designate that the proofing service 110 is available for use based on a spelling property and a grammar property. In this manner, the platform 106 may obscure the proofing service 110 from the application 104 while permitting the application access to the proofing service's functions. In the foregoing example, the application 104 may be obscured from the linguistic services 108. Responsive to an API call specifying a property, the platform 106 may designate each linguistic service that has the specified property.

Communication is brokered communication through the platform (block 506). For example, the platform 106 may control communication between the application and the designated linguistic services so that the application does not directly communicate with the designated linguistic services. In this manner, the linguistic service and the application may be obscured from each other. By brokering communication in this manner, the application and the linguistic service may be independent from each other.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
designating, using a computing device, a linguistic service, based on a functional service property of the linguistic service, that is available through a platform to recognize linguistic property information associated with text data; and
using, with the computing device, the functional service property to broker communication between an application specifying the functional service property and a linguistic service that matches the functional service property effective to obscure the linguistic service to the platform, without the application issuing an application program interface (API) specifying the linguistic service.

2. The computer-implemented method of claim 1, wherein linguistic property information includes an indication of an action associated with the text data.

3. The computer-implemented method of claim 1, wherein the designation makes the application aware of each linguistic service available to the application responsive to an application program interface (API) call.

4. The computer-implemented method of claim 1, wherein responsive to an application program interface (API) call that indicates an output format for the linguistic property information, the linguistic property information is output in the output format.

5. The computer-implemented method of claim 1, wherein the linguistic service is designated based on a particular property specified by the application.

6. The computer-implemented method of claim 1, wherein the linguistic property information is associated with text data within a range of a text from the application.

7. The computer-implemented method of claim 1, further comprising upon completion of text recognition, forming a callback.

8. The computer-implemented method of claim 1, further comprising when the text data is altered, freeing memory containing the linguistic property information associated with the text data.

9. A system comprising:
one or more processors;
one or more computer-readable storage media;
instructions on the one or more computer-readable storage media which, when executed by the one or more processors, provide:
a linguistic service to recognize linguistic property information associated with text data within a range of a text; and
a platform to broker communication between the linguistic service and an application, in which the platform obscures the linguistic service to the application, wherein the platform is further configured to designate the linguistic service to the application based on a functional service property of the linguistic service, without the application issuing an application program interface (API) call specifying the linguistic service.

10. The system of claim 9, wherein the platform is further configured to responsive to an application program interface (API) call, designate each linguistic service having a particular property indicated in the API call.

11. The system of claim 9, wherein the linguistic service is further configured as a plugin to the platform.

12. The system of claim 9, wherein the platform is further configured to upon completing recognition of linguistic property information, communicate a callback.

13. The system of claim 9, wherein the linguistic service is further configured to output the linguistic property information in a format indicated by the application.

14. One or more tangible computer-readable storage media comprising instructions that are executable by a computer to:
designate a linguistic service having a particular functional property available through a platform responsive to an application program interface (API) call specifying the particular functional property of the linguistic service, without the API call specifying the linguistic service; and
broker communication between the application and the linguistic service without the application directly communicating with the linguistic service.

15. One or more tangible computer-readable storage media as described in claim 14, wherein the instructions are further executable to indicate that the linguistic service is configured to perform an action associated with text data in a range of a text.

16. One or more tangible computer-readable storage media as described in claim 14, wherein the instructions are further executable to recognize linguistic property information associated with text data within a range of a text responsive to receiving the text.

17. One or more tangible computer-readable storage media as described in claim 14, wherein the instructions are further executable to, responsive to receiving an application program interface (API) call indicating an output format, output linguistic property information in the output format.

18. One or more tangible computer-readable storage media as described in claim 14, wherein the instructions are further executable to upon completing recognize linguistic property information, form a callback to the application.

19. One or more tangible computer-readable storage media as described in claim 14, wherein the linguistic service is independent from the application.

* * * * *